United States Patent [19]
Kilgore et al.

[11] 3,975,646
[45] Aug. 17, 1976

[54] ASYNCHRONOUS TIE

[75] Inventors: Lee A. Kilgore, Export; Gurney L. Godwin; Eugene C. Whitney, both of Pittsburgh, all of Pa.

[73] Assignee: Westinghouse Electric Corporation, Pittsburgh, Pa.

[22] Filed: Jan. 13, 1975

[21] Appl. No.: 540,748

[52] U.S. Cl.................................. 307/21; 322/32
[51] Int. Cl.² ......................................... H02J 3/12
[58] Field of Search..................... 307/21, 13, 126; 321/60, 61, 66; 322/32; 310/112, 114, 83

[56] References Cited
UNITED STATES PATENTS

| | | | |
|---|---|---|---|
| 2,213,945 | 9/1940 | Alexanderson | 307/21 |
| 3,183,431 | 5/1965 | Ford | 322/32 |
| 3,571,693 | 3/1971 | Riaz | 322/32 |

OTHER PUBLICATIONS

B. H. Smith, "Synchronous Behavior of Doubly Fed Twin Stator Induction Machine", IEEE Transactions on Power Apparatus and Systems, vol. PAS-86, No. 10, Oct. 1967, pp. 1227–1236.

*Primary Examiner*—Robert K. Schaefer
*Assistant Examiner*—M. Ginsburg
*Attorney, Agent, or Firm*—D. T. Griggs

[57] ABSTRACT

Two cascaded induction machines provide asynchronous power transmission between two independent generating networks. The shafts of the two induction machines are mechanically connected for concurrent rotation and the rotor windings of the two machines are electrically connected in a reverse phase sequence. The cascaded induction machines are geared to a relatively low power variable speed drive which accurately controls the position and rotation of the shafts. A control system supplies low frequency excitation current for the variable speed drive and is capable of continuous operation through zero frequency to reverse the direction of rotation. The control system determines the level of power flow within the induction machines and is unresponsive to the difference in frequency of generation of the two generating networks so that the power flow is controlled even under transient load conditions.

7 Claims, 1 Drawing Figure

ASYNCHRONOUS TIE

BACKGROUND OF THE INVENTION

1. Field of the Invention

This invention relates to systems for transmitting power between interconnected, but otherwise independent, power generating networks and particularly to an asynchronous tie between such power generating networks which utilizes concatenated brushless wound rotor machines.

2. Description of the Prior Art

Electrical power is transmitted over great distances from one power system to another by means of high voltage transmission lines. The interconnection of large independent power systems has made possible the efficient allocation of available power over wide areas. For stability reasons, such interconnected systems are synchronized in time and frequency of generation and thus are said to be "synchronously tied."

Power flow in synchronous to synchronous transmission systems is determined by total system adjustments, including load frequency control, which accomodate a surplus or a deficiency of interconnection generation with respect to the load to be supplied. These control systems have generally proven satisfactory for use with systems having large power reserves; however, there has been continuing and rapid growth of electrical loads which has cut power reserve margins to a critical value. Furthermore, the synchronously tied system with load frequency control is inherently unstable since it will allow an individual system to contribute indefinitely to an external disturbance. Thus, there is an increasing risk that the synchronously interconnected system, operating with marginal reserves, will become unstable upon the occurrence of a remote load disturbance and possibly cause a major power failure.

Certain alternatives to the synchronous tie method of interconnecting independent power systems have been considered over the years. There has been some interest in a high voltage DC transmission system which has the advantage of avoiding synchronous to synchronous stability limitations since such a system inherently provides a non-synchronous tie. While some proposals have been made in this direction, progress in this direction has been slow because of the practical difficulty in generating the high voltage DC levels required and the added expense of converting the DC so that it may be utilized by equipment designed for a 60 Hz AC power supply.

An asynchronous tie which is compatible with existing AC transmission and distribution systems has been disclosed by Alexanderson U.S. Pat. No. 2,213,945. According to the teachings of Alexanderson, asynchronous power transfer is achieved in an induction generator which is driven by a prime mover at a range of speeds extending below and above synchronous operation. As is well known, high slip operation is encountered when the prime mover shaft speed varies, and it is accompanied by corresponding high rotor losses and thus low conversion efficiency. The complex control circuitry which has been suggested to permit high efficiency operation regardless of slip results in a relatively low power factor. A further limitation of such prior art schemes has been the requirement for slip rings and brushes to permit connection to the rotor windings. Such a connection is not well suited for large machines running at high speeds and drawing large currents.

Because of the disadvantage of the prior art as described above, an improved system tie was sought which would be compatible with existing power systems and transmission lines, which would control the power flow between the systems even under transient load conditions, and which would improve the operating stability of the interconnected systems. The present invention permits the efficient use of concatenated brushless wound rotor induction machines to satisfy these requirements.

By way or addition background, reference is made to the fact that the prior art shows some combinations of apparatus that include concatenated brushless wound rotor induction machines. For example, see B. H. Smith, "Synchronous Behavior of Doubly Fed Twin Stator Induction Machine," IEEE Transactions on Power Apparatus and Systems, Volume PAS-86, No. 10, October 1967, pages 1237–2136, in which an induction machine is fitted with two independent sets of stator windings and two interconnected rotor windings is synchronously excited from two systems to permit variable speed operation. It is additionally acknowledged that cycloconverters have been used to generate low frequency AC for variable speed motor drives, for example as disclosed in B. R. Pelly, "Thyristor Phase-Controlled Converters And Cycloconverters," New York, Wyley-Interscience, 1971, pages 18 et seq.

SUMMARY OF THE INVENTION

Asynchronous power transfer between two independent generating networks is provided by an induction machine system having no sliding contacts or commutators. It is assumed that both systems are regulated to operate at or very near the same frequency and voltage level. The asynchronous tie described herein is adapted to compensate for limited variations in frequency of generation of such independent generating networks.

In accordance with the present invention, two brushless, wound rotor induction machines are linked together mechanically and electrically. The shafts of two induction machines are mechanically connected for concurrent rotation and the rotor windings of the two machines are electrically connected in a reverse phase sequence. The stator winding of each induction machine is electrically connected through a transmission line to a power generating network so that power may be delivered to or taken from either generating network. The cascaded induction machines are geared to a relatively low power variable speed drive motor which is excited by an electronic control system for accurate control of torque. The output of the electronic control system regulates the level of power flow within the induction machines and is not responsive to the difference in frequency of generation of the two generating networks.

The power flow, P, through the cascaded induction machines is determined by the voltage on the two stator windings, $V_1$ and $V_2$, the combined reactance of the two inductance machines, $x_m$, and the system reactance, $x_s$, and the electrical phase angle, $\alpha$, between them:

$$P = \frac{V_1 V_2}{x_m + x_s} \sin\alpha .$$

With each stator connected to its three phase generating network, a rotating magnetic field is produced in the air gap of each induction machine, and power is transferred from stator to rotor by magnetic induction. By adjusting the angular position of the rotor the electrical phase angle $\alpha$ may be set for any desired magnitude and direction of power flow. The rotor position and phase angle, $\alpha$, is controlled by means of a variable speed drive motor. The drive motor is excited by a control system including a solid state cycloconverter which regulates the power flow independently of the difference in frequency of generation. When there is no difference in frequency of generation, the cascaded rotors are driven to the angular position which corresponds with a predetermined level and direction of power flow. Upon the occurrence of a difference in frequency of generation, a compensating drive signal is produced by the control network which causes the variable speed drive motor to turn the mechanically coupled induction machine rotors at an angular velocity which is proportional to the difference in frequency of generation. By controlling the angular speed and direction of rotation of the cascaded rotors, the rotor field can be advanced or retarded slightly from its normal steady state condition. If $\omega_R$ is the angular velocity of the rotor and $\omega_S$ is the angular velocity of the stator field with respect to the rotor, the angular velocity of the rotor field $\omega$ is:

$$\omega = \omega_S \pm \omega_R$$

from which $$f = f_S \pm f_R.$$

Thus the cascaded rotors turn at an angular velocity and in the proper direction so that power is supplied from one generating network operating at a given frequency to a second power generating network operating at a different frequency, either higher or lower.

BRIEF DESCRIPTION OF THE DRAWING

The invention will be more fully understood from the following detailed description, taken in connection with the accompanying drawing, in which a schematic diagram of a preferred embodiment of the present invention is shown.

DESCRIPTION OF THE PREFERRED EMBODIMENT

Figure 1:
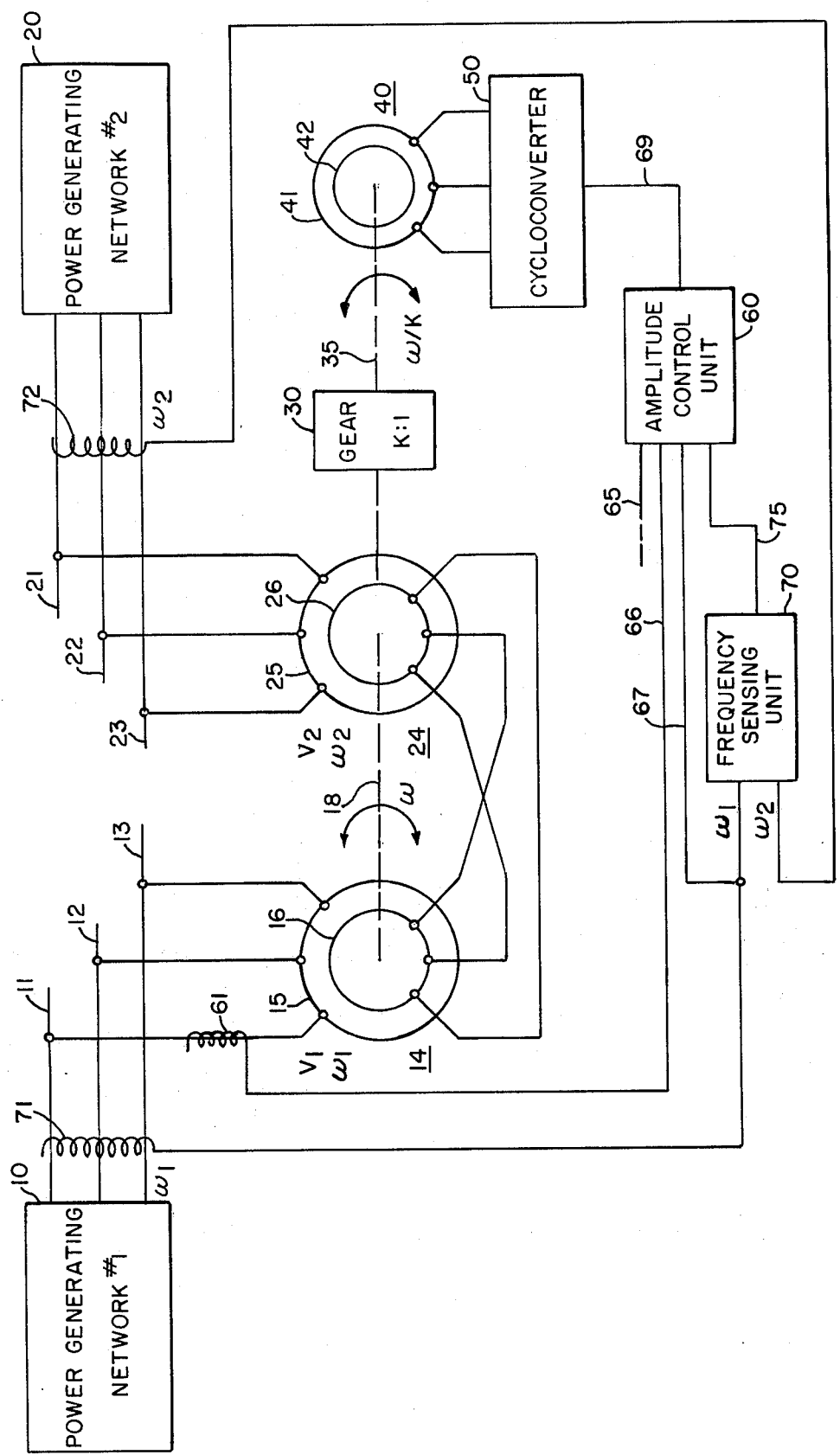

The drawing illustrates a preferred arrangement for the present invention wherein independent three-phase power generating networks 10 and 20 which operate at or near the same frequency and voltage levels are linked together by means of three phase wound rotor induction dynamoelectric machines 14, 24 which are adapted to transfer power from one network to the other asynchronously. The power generating network 10 is adapted to operate at a level of $V_1$ volts per phase and at an angular frequency of $\omega_1$ radians per second. In a similar manner, the power generating network 20 is adapted to operate at a level of $V_2$ volts per phase and at an angular frequency of $\omega_2$ radians per second. The induction machines 14, 24 have phase windings (not shown) disposed in a conventional manner upon laminated stators 15, 25 and laminated rotors 16, 26, respectively. The stator and rotor windings of the induction machine 14 are wound for $p_1$ pole pairs while the windings of induction machine 24 are wound for $p_2$ pole pairs. It is preferred that $p_1$ equal $p_2$ in the present invention. The stator phase windings of induction machine 14 are electrically connected to phase conductors 11, 12 and 13 so that power may be taken from or delivered to the power generating network 10. Similarly, the stator phase windings of induction machine 24 are electrically connected to phase conductors 21, 22 and 23 so that power may be taken from or delivered to the power generating network 20.

The rotors 16, 26 of the induction machines 14, 24 are mechanically connected to a shaft 18 for concurrent rotation. The rotor phase windings are electrically connected in a closed circuit and are connected in a reverse phase sequence, as indicated. The phase sequence is reversed on the two induction machines so that a small angle change on the shaft will produce a forward shift in phase angle in one and a backward shift in the other, giving twice the change in electrical phase angle that would occur in one machine. The two cascaded induction machines then will perform as one induction machine with $(p_1 + p_2)$ pole pairs. The reverse phase connection allows the use of a relatively small, low speed drive motor for system control.

The cascaded induction machines 14, 24 are connected to a low power, variable speed drive motor 40 through a shaft 35 and a gear 30 so that the position and speed of rotation of the concatenated rotors 16, 26 may be accurately controlled. The gear transmission ratio, K:1, may be selected to further reduce the physical size of the drive machine required for specified operating speed and torque. Assuming that the difference in frequency between the two systems is small even under transient conditions, the power required to control the rotor positions is small. Thus a relatively low power variable speed motor may be used, providing it is at least powerful enough to match the electrical torque of the concatenated machines plus sufficiently more to accelerate its inertia to change the position of the shaft at a sufficient rate to keep up with relative system swings.

For systems intended to be operated near the same frequency, for example 60 Hz, differences in frequency of generation will usually not exceed 2%. Thus the variable speed drive equipment need only have a capacity corresponding to the normal range of 2% in speed. Such a drive could be provided by a DC machine with electronic control of the armature current. The preferred variable speed drive motor 40, however, comprises an induction machine excited by a cycloconverter 50 which is capable of supplying a low frequency current controllable in amplitude and frequency and capable of going smoothly through zero frequency to reverse the direction of rotation.

The output of the cycloconverter 50 is electrically connected to phase windings of the stator 41 of the drive motor 40. The cycloconverter 50 is generally known to be a device for converting AC power of one frequency to AC power of a lower frequency. It may comprise various types of elements but of particular interest are those which employ solid state components such as thyristors for the principal functional elements. The cycloconverter receives threephase power from an auxiliary source (not shown) and has means to modify each phase of the AC input while maintaining 120° between phases. Its operation is comparable to three voltage regulated thyristor dual converters, one for each phase. As a reference, each dual converter receives a low frequency voltage that is developed by a frequency sensing unit 70 and an amplitude control unit 60. Gradual changes in the reference frequency and amplitude provide changes in the output frequency of the cycloconverter, and hence a drive signal is impressed across the phase windings of the drive motor stator 41 thereby causing a change in applied torque, rotor position, and speed so that the velocity of the rotor magnetic field is changed.

In accordance with a preferred form of the present invention there are provided independent amplitude control and frequency sensing units 60 and 70, respectively, for the cycloconverter 50. The units 60 and 70 may be constructed in accordance with known techniques. The frequency sensing unit 70 has applied to it signals which are related to the frequency of generation $\omega_1$ of the power generating network 10 and $\omega_2$ of the power generating network 20. The frequency signals may be developed by potential transformers 71 and 72 which are coupled to phase conductors 13 and 23 respectively. The frequency control unit 70 is adapted to sense the difference in frequency of generation, $\omega_2 - \omega_1$, and develops a signal which is proportional to that difference. Since power flow through the system is controlled by the phase angle, and changes in the phase angle are opposed by the inertia of the induction machines, the torque must be accurately controlled to avoid setting up sustained oscillations or serious overswings in phase angle correction and power. Accordingly, the time rate of change of the difference in frequency of generation is sensed by the frequency sensing unit 70 which is adapted to provide velocity and acceleration feedback to the control unit 60 by the connection 75, thereby compensating for sudden accelerations in either system.

The amplitude control unit 60 is a polyphases power sensing device which adjusts the driving torque to control the power flow to a preset value as determined by the input signals 65, 66, 67 and 75. The signal 65 is a bias signal from an independent controller (not shown) which establishes the steady state power flow level and direction. The steady state power flow is controlled by adjusting the bias signal 65 which causes a change in the drive motor 40 torque output. A change in the driving torque causes a change in the angle of the shaft 18 which in turn varies the electrical angle $\alpha$ and so the power. The reference signals 66 and 67, which are proportional to the voltage and current assocoated with the stator 15 of the induction machine 14, are also provided as inputs to the amplitude control unit 60. These reference signals may be developed, for example, by transformers 61, 71 which are coupled to the conductors which connect the induction machine 14 with the power generating network 10. As discussed above, the signal 75 is proportional to the time rate of change of the difference in frequency of generation and is used to accelerate the concatenated system at a rate corresponding to sudden changes in load or connected generation. The output signal 69 of the amplitude control unit 60 is connected directly to the cycloconverter 50 and provides a control signal which is a predetermined function of its steady state, transient, and reference input signals.

When both power generating networks 10 and 20 are operating at the same frequency, for example 60 Hz, the shaft 18 is stationary and the power flow is from stator to rotor by transformer action or magnetic induction in a first induction machine, and then by electrical conduction from the rotor of that induction machine to the rotor of the second induction machine, and then by magnetic induction from the rotor of the second machine to its stator. The direction and magnitude of power flow is dependent upon the phase angle between the two systems and is controlled by the angular position $\alpha$ of the shaft 18.

Excitation of the phase windings of the stator 15, for example by polyphase power of a given frequency, will produce a rotating magnetic field, rotating at a speed which is the ratio of the frequency and the number of pole pairs. Thus, for a four pole pair winding excited at 60 Hz, the stator field will rotate at 15 revolutions per second. When the rotor 16 is held in a stationary position, the rotating stator field will induce in the phase windings of the stationary rotor 16 corresponding current of the same frequency, i.e., 60 Hz. However, if the rotor 16 is not held in a stationary position and is caused to rotate, the velocity of the rotating stator field with respect to the rotor 16 will vary according to the magnitude and direction of the rotation of the shaft 18. For example, if the rotor 16 rotates in the opposite direction from that of the rotating stator field rotation, then the frequency of the induced current will be the stator excitation frequency (60 Hz) increased by an amount equal to the rotational speed multiplied by the number of pole pairs. Conversely, if the rotor 16 rotates in the same direction as that of the rotating stator field, the frequency of the induced current will be decreased by the same amount. The same analysis also holds true for power flow in the induction machine 24.

During a change in connected generation or load disturbance which causes fluctuations in power requirements and operating frequency, it becomes necessary to supply power to compensate for these fluctuations. Fluctuations in frequency of generation is usually no more than a few tenths of a cycle for a regulated 60 Hz system. As discussed above, compensation is provided in the present invention by causing the shaft 18 to rotate at a speed proportional to the difference in frequency of generation of the two generating networks 10 and 20. The torque on the shaft 18 is applied in the proper direction to induce the power flow as desired in either direction.

The power generating networks are connected for asynchronous power transfer by connecting the power generating network 10 to the phase windings of the stator 15 and then by rotating the shaft 18 to match the transformed frequency and phase angle to the other system. The power generating network 20 is then connected to the phase windings of the stator 25 with no difference in phase angle and no power flow. Any difference in voltage will circulate reactive, but due to the inherently high reactance of the concatenated induction machines, its effect is negligible. Power flow is controlled by changing the torque on the drive motor 40 which changes the angular position of the shaft 18 and the electrical angle $\alpha$.

The drawing omits for simplicity a number of elements that would normally be employed in practice, such as circuit breakers in the connections between the phase connectors of the power generating networks and the stators of the induction machines.

It will be understood that the induction machine system, described herein as comprising separate machines coupled together mechanically, may comprise separate machines incorporated in a single housing with the rotors mounted upon a common shaft. Where either the stator windings or rotor windings, or both, are carried by common stator or rotor core respectively, provisions should be made to avoid interaction between the windings.

We claim:

1. A dynamoelectric machine system for transmitting electrical power from a first generating network to a second generating network, said dynamoelectric machine system comprising:

a first dynamoelectric machine having a rotor winding disposed upon a shaft which is journalled for rotation within an annular stator, said stator having a winding which is adapted for electrical connection to said first generating network whereby power by be delivered to or taken from said first generating network, said rotor and stator windings being wound for a predetermined number of poles, said rotor winding being magnetically coupled by mutual inductance with said stator winding;

a second dynamoelectric machine having a rotor winding disposed upon a shaft which is journalled for rotation within an annular stator, said stator having a winding which is adapted for electrical connection to said second generating network whereby power may be delivered to or taken from said generating network, said rotor and stator windings being wound for a predetermined number of poles, said rotor winding being magnetically coupled by mutual inductance with said stator winding;

said first dynamoelectric machine shaft being mechanically connected to said second dynamoelectric machine shaft for concurrent rotation therewith;

said first dynamoelectric machine rotor winding being electrically connected to said second dynamoelectric machine rotor winding in a closed electrical circuit; and means for controlling the angular position and speed of rotation of said mechanically interconnected shafts.

2. The dynamoelectric machine system of claim 1 wherein said means for controlling the angular position and speed of rotation of said interconnected shafts comprises a variable speed drive motor, said variable speed drive motor having a rotor disposed upon a shaft which is journalled for rotation within an annular stator, said variable speed drive motor shaft being mechanically connected to said interconnected dynamoelectric machine shafts for concurrent rotation therewith, said stator having a winding which is adapted to receive electrical control excitation, and means for supplying control excitation to said stator winding.

3. The dynamoelectric machine system of claim 2 wherein said control excitation is provided by a cycloconverter which is electrically connected to said variable speed motor stator winding, said cycloconverter being capable of supplying low frequency current for said electrical control excitation, said cycloconverter control excitation further being capable of continuous control through zero frequency to reverse the direction of rotation of said variable speed motor.

4. The dynamoelectric machine system of claim 3 wherein independent amplitude control and frequency sensing units are associated with said cycloconverter to regulate the current amplitude and frequency of said control excitation applied to said drive motor stator winding in accordance with a predetermined level of electrical power flow in said dynamoelectric machine system and in accordance with the difference of frequency of generation of said first generating network and said second generating network, said control excitation being a predetermined function of said power level and said frequency difference.

5. The dynamoelectric machine system of claim 4 wherein said frequency sensing unit is adapted to sense the time rate of change of said difference in frequency of generation and said amplitude control unit is adapted to provide control excitation to said cycloconverter which is a predetermined function of said time rate of change of said frequency difference and of the first time derivative of said time rate of change of said frequency difference.

6. The dynamoelectric machine system of claim 2 wherein said variable speed drive motor is mechanically connected to said interconnected dynamoelectric machine shafts through a mechanical gear having a predetermined transmission ratio.

7. The dynamoelectric machine system of claim 1 wherein said first dynamoelectric machine rotor winding is electrically connected to said second dynamoelectric machine rotor winding in a reverse phase sequence.

* * * * *